(12) United States Patent
Ebel et al.

(10) Patent No.: US 7,840,449 B2
(45) Date of Patent: Nov. 23, 2010

(54) TOTAL INVENTORY MANAGEMENT

(75) Inventors: Janice D. Ebel, Stowe, VT (US); Kristin D. Loughrey, Duxbury, VT (US); Tracey L. Pilkinton, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 1392 days.

(21) Appl. No.: 10/711,271

(22) Filed: Sep. 7, 2004

(65) Prior Publication Data

US 2006/0053069 A1    Mar. 9, 2006

(51) Int. Cl.
G06Q 10/00    (2006.01)
G06Q 30/00    (2006.01)

(52) U.S. Cl. .......................................... 705/28; 705/26
(58) Field of Classification Search ................... 705/28, 705/26; 364/468
See application file for complete search history.

(56) References Cited

U.S. PATENT DOCUMENTS

| | | | | |
|---|---|---|---|---|
| 4,864,494 A * | 9/1989 | Kobus, Jr. | ..................... | 726/33 |
| 4,887,206 A * | 12/1989 | Natarajan | ..................... | 705/29 |
| 4,887,207 A * | 12/1989 | Natarajan | ..................... | 705/10 |
| 4,887,218 A * | 12/1989 | Natarajan | ..................... | 700/102 |
| 4,887,507 A * | 12/1989 | Shaw | .......................... | 84/474 |
| 5,155,679 A * | 10/1992 | Jain et al. | .................... | 700/106 |
| 5,168,445 A * | 12/1992 | Kawashima et al. | .......... | 705/10 |
| 5,231,567 A * | 7/1993 | Matoba et al. | .............. | 700/100 |
| 5,268,838 A * | 12/1993 | Ito | .............................. | 700/99 |
| 5,287,267 A * | 2/1994 | Jayaraman et al. | ............ | 705/10 |
| 5,351,195 A * | 9/1994 | Sherman | ..................... | 700/100 |
| 5,404,291 A * | 4/1995 | Kerr et al. | ....................... | 705/5 |
| 5,548,518 A * | 8/1996 | Dietrich et al. | ............. | 700/100 |
| 5,630,070 A * | 5/1997 | Dietrich et al. | ................ | 705/8 |
| 5,666,493 A * | 9/1997 | Wojcik et al. | ................. | 705/26 |
| 5,819,232 A * | 10/1998 | Shipman | ........................ | 705/8 |
| 5,841,659 A * | 11/1998 | Tanaka et al. | ............... | 700/121 |
| 5,884,276 A * | 3/1999 | Zhu et al. | ...................... | 705/8 |
| 5,884,300 A | 3/1999 | Brockman | | |
| 5,897,624 A * | 4/1999 | Ramaswamy | ................ | 705/28 |
| 5,995,945 A * | 11/1999 | Notani et al. | ................. | 705/28 |
| 6,006,196 A * | 12/1999 | Feigin et al. | .................. | 705/10 |
| 6,021,396 A * | 2/2000 | Ramaswamy et al. | ......... | 705/28 |
| 6,041,267 A * | 3/2000 | Dangat et al. | ............... | 700/107 |
| 6,044,356 A * | 3/2000 | Murthy et al. | ................. | 705/8 |
| 6,049,742 A * | 4/2000 | Milne et al. | ................... | 700/99 |
| 6,078,900 A * | 6/2000 | Ettl et al. | ...................... | 705/28 |
| 6,128,540 A * | 10/2000 | Van Der Vegt et al. | ........ | 700/36 |
| 6,144,893 A * | 11/2000 | Van Der Vegt et al. | ...... | 700/108 |
| 6,272,389 B1 * | 8/2001 | Dietrich | ...................... | 700/101 |
| 6,341,266 B1 | 1/2002 | Braun | | |
| 6,341,271 B1 * | 1/2002 | Salvo et al. | ................... | 705/28 |
| 6,415,195 B1 * | 7/2002 | Gleditsch et al. | ............. | 700/99 |
| 6,500,680 B1 * | 12/2002 | Tai et al. | ........................ | 438/6 |

(Continued)

*Primary Examiner*—F. Ryan Zeender
*Assistant Examiner*—Ashford Hayes
(74) *Attorney, Agent, or Firm*—Richard Kotulak; Hoffman Warnick LLC

(57) ABSTRACT

A method, system and program product to manage total inventory. Existing inventory, optimum inventory, excess inventory and inventory consumption are calculated according to different sets of data regarding whether one is considering a policy inventory and/or a manufacturing limitation. Results of the calculations with different sets of data are compared to determine an impact of the policy inventory and an inventory trapped in manufacturing. This invention has application in the microelectronics industry as well as other industries.

15 Claims, 13 Drawing Sheets

U.S. PATENT DOCUMENTS

| | | | |
|---|---|---|---|
| 6,594,535 B1* | 7/2003 | Costanza | 700/97 |
| 6,615,092 B2* | 9/2003 | Bickley et al. | 700/99 |
| 6,889,106 B2* | 5/2005 | Wei | 700/100 |
| 6,970,841 B1* | 11/2005 | Cheng et al. | 705/28 |
| 7,058,587 B1* | 6/2006 | Horne | 705/7 |
| 7,092,776 B2* | 8/2006 | Torii et al. | 700/99 |
| 7,181,501 B2* | 2/2007 | Defosse | 709/217 |
| 7,222,786 B2* | 5/2007 | Renz et al. | 235/385 |
| 7,225,140 B2* | 5/2007 | Yanagino et al. | 705/10 |
| 7,248,937 B1* | 7/2007 | Brown et al. | 700/99 |
| 7,249,068 B1* | 7/2007 | Kakouros et al. | 705/28 |
| 7,376,477 B2* | 5/2008 | Adair et al. | 700/95 |
| 7,380,213 B2* | 5/2008 | Pokorny et al. | 715/764 |
| 7,546,225 B2* | 6/2009 | Nguyen et al. | 703/2 |
| 7,580,766 B1* | 8/2009 | Sharma et al. | 700/100 |
| 2001/0020230 A1* | 9/2001 | Kaneko et al. | 705/8 |
| 2001/0034673 A1* | 10/2001 | Yang et al. | 705/28 |
| 2002/0002517 A1 | 1/2002 | Fox | |
| 2002/0072956 A1* | 6/2002 | Willems et al. | 705/10 |
| 2002/0072988 A1* | 6/2002 | Aram | 705/26 |
| 2002/0082816 A1* | 6/2002 | Nguyen et al. | 703/13 |
| 2002/0095307 A1 | 7/2002 | Greamo et al. | |
| 2002/0107753 A1 | 8/2002 | Laughlin et al. | |
| 2002/0165804 A1* | 11/2002 | Beebe et al. | 705/28 |
| 2002/0174000 A1* | 11/2002 | Katz et al. | 705/7 |
| 2002/0178092 A1 | 11/2002 | Hayes | |
| 2003/0033179 A1* | 2/2003 | Katz et al. | 705/7 |
| 2003/0050817 A1* | 3/2003 | Cargille et al. | 705/8 |
| 2003/0050870 A1* | 3/2003 | Cargille et al. | 705/28 |
| 2003/0061126 A1* | 3/2003 | Erke et al. | 705/28 |
| 2003/0083963 A1* | 5/2003 | Benson | 705/28 |
| 2003/0088449 A1* | 5/2003 | Menninger | 705/8 |
| 2003/0101107 A1* | 5/2003 | Agarwal et al. | 705/28 |
| 2003/0101110 A1* | 5/2003 | Chen et al. | 705/29 |
| 2003/0120563 A1 | 6/2003 | Meyer | |
| 2003/0126103 A1* | 7/2003 | Chen et al. | 706/50 |
| 2003/0158795 A1* | 8/2003 | Markham et al. | 705/28 |
| 2003/0171963 A1* | 9/2003 | Kurihara et al. | 705/7 |
| 2003/0212590 A1 | 11/2003 | Klingler | |
| 2003/0212614 A1 | 11/2003 | Chu et al. | |
| 2003/0225635 A1* | 12/2003 | Renz et al. | 705/28 |
| 2004/0024628 A1* | 2/2004 | Eck et al. | 705/8 |
| 2004/0034555 A1* | 2/2004 | Dismukes et al. | 705/7 |
| 2004/0073472 A1* | 4/2004 | Sakuma et al. | 705/8 |
| 2004/0117227 A1* | 6/2004 | Wei | 705/7 |
| 2004/0128213 A1* | 7/2004 | Wei | 705/28 |
| 2004/0148047 A1* | 7/2004 | Dismukes et al. | 700/100 |
| 2004/0225579 A1* | 11/2004 | Peery et al. | 705/28 |
| 2004/0249689 A1* | 12/2004 | Naraki et al. | 705/7 |
| 2004/0260703 A1* | 12/2004 | Elkins et al. | 707/100 |
| 2005/0004833 A1* | 1/2005 | McRae et al. | 705/11 |
| 2005/0256787 A1* | 11/2005 | Wadawadigi et al. | 705/28 |
| 2005/0283412 A1* | 12/2005 | Cheng et al. | 705/28 |
| 2006/0004617 A1* | 1/2006 | Najmi et al. | 705/7 |
| 2006/0080160 A1* | 4/2006 | Orumchian et al. | 705/10 |
| 2006/0080294 A1* | 4/2006 | Orumchian et al. | 707/3 |
| 2006/0287908 A1* | 12/2006 | Orumchian et al. | 705/10 |
| 2008/0015915 A1* | 1/2008 | Fischer et al. | 705/7 |

\* cited by examiner

FIG. 3

| PN | Site | Date | Record Type | Quantity/Pieces |
|---|---|---|---|---|
| 0000076P5519 | 09BD | 20030725 | Beginning Inventory | 41,903 |
| 0000076P5519 | 09BD | 20031030 | Demand | 10,000 |
| 0000076P5519 | 09BD | 20040214 | Demand | 10,000 |
| 0000076P5519 | 09BD | 20040731 | Demand | 10,000 |

FIG. 5

| PN | Site | Date | Optimum |
|---|---|---|---|
| 0000076P5519 | 09BD | 20030725 | 0 |
| 0000076P5519 | 09BD | 20030731 | 0 |
| 0000076P5519 | 09BD | 20030831 | 0 |
| 0000076P5519 | 09BD | 20030930 | 0 |
| 0000076P5519 | 09BD | 20031031 | 0 |
| 0000076P5519 | 09BD | 20031130 | 0 |
| 0000076P5519 | 09BD | 20031231 | 0 |
| 0000076P5519 | 09BD | 20040131 | 0 |
| 0000076P5519 | 09BD | 20040229 | 0 |
| 0000076P5519 | 09BD | 20040331 | 0 |
| 0000076P5519 | 09BD | 20040430 | 0 |
| 0000076P5519 | 09BD | 20040531 | 0 |
| 0000076P5519 | 09BD | 20040630 | 0 |
| 0000076P5519 | 09BD | 20040731 | 10,000 |

FIG. 6

| PN | Site | Bucket Date | Existing | Optimum | Excess |
|---|---|---|---|---|---|
| 0000076P5519 | 09BD | 20030725 | 41,903 | 0 | 41,903 |
| 0000076P5519 | 09BD | 20030731 | 41,903 | 0 | 41,903 |
| 0000076P5519 | 09BD | 20030831 | 41,903 | 0 | 41,903 |
| 0000076P5519 | 09BD | 20030930 | 41,903 | 0 | 41,903 |
| 0000076P5519 | 09BD | 20031031 | 31,903 | 0 | 31,903 |
| 0000076P5519 | 09BD | 20031130 | 31,903 | 0 | 31,903 |
| 0000076P5519 | 09BD | 20031231 | 31,903 | 0 | 31,903 |
| 0000076P5519 | 09BD | 20040131 | 31,903 | 0 | 31,903 |
| 0000076P5519 | 09BD | 20040229 | 21,903 | 0 | 21,903 |
| 0000076P5519 | 09BD | 20040331 | 21,903 | 0 | 21,903 |
| 0000076P5519 | 09BD | 20040430 | 21,903 | 0 | 21,903 |
| 0000076P5519 | 09BD | 20040531 | 21,903 | 0 | 21,903 |
| 0000076P5519 | 09BD | 20040630 | 21,903 | 0 | 21,903 |
| 0000076P5519 | 09BD | 20040731 | 21,903 | 10,000 | 11,903 |

FIG. 7

| PN | Site | Date | Category | Existing | Optimum | Excess |
|---|---|---|---|---|---|---|
| 0000076P5519 | 09BD | 20030731 | Base | 41,903 | 0 | 41,903 |
| 0000076P5519 | 09BD | 20031031 | ST | 31,903 | 0 | 31,903 |
| 0000076P5519 | 09BD | 20040131 | MT | 31,903 | 0 | 31,903 |
| 0000076P5519 | 09BD | 20040731 | LT | 21,903 | 10,000 | 11,903 |

FIG. 8

| PN | Site | Bucket Date | Existing | Optimum | Excess |
|---|---|---|---|---|---|
| 0000076P5519 | 09BD | 20030725 | 41,903 | 0 | 41,903 |
| 0000076P5519 | 09BD | 20030731 | 41,903 | 0 | 41,903 |
| 0000076P5519 | 09BD | 20030831 | 41,903 | 0 | 41,903 |
| 0000076P5519 | 09BD | 20030930 | 41,903 | 0 | 41,903 |
| 0000076P5519 | 09BD | 20031031 | 31,903 | 0 | 31,903 |
| 0000076P5519 | 09BD | 20031130 | 31,903 | 0 | 31,903 |
| 0000076P5519 | 09BD | 20031231 | 31,903 | 0 | 31,903 |
| 0000076P5519 | 09BD | 20040131 | 31,903 | 10,000 | 21,903 |
| 0000076P5519 | 09BD | 20040229 | 21,903 | 0 | 21,903 |
| 0000076P5519 | 09BD | 20040331 | 21,903 | 0 | 21,903 |
| 0000076P5519 | 09BD | 20040430 | 21,903 | 0 | 21,903 |
| 0000076P5519 | 09BD | 20040531 | 21,903 | 0 | 21,903 |
| 0000076P5519 | 09BD | 20040630 | 21,903 | 0 | 21,903 |
| 0000076P5519 | 09BD | 20040731 | 21,903 | 10,000 | 11,903 |

FIG. 9

| PN | Site | Date | Category | Existing | Optimum | Excess |
|---|---|---|---|---|---|---|
| 0000076P5519 | 09BD | 20030731 | Base | 41,903 | 0 | 41,903 |
| 0000076P5519 | 09BD | 20031031 | ST | 31,903 | 0 | 31,903 |
| 0000076P5519 | 09BD | 20040131 | MT | 31,903 | 10,000 | 21,903 |
| 0000076P5519 | 09BD | 20040731 | LT | 21,903 | 10,000 | 11,903 |

FIG. 10

| PN | Site | Bucket Date | Existing | Optimum | Excess |
|---|---|---|---|---|---|
| 0000076P5519 | 09BD | 20030725 | 41,903 | 0 | 41,903 |
| 0000076P5519 | 09BD | 20030731 | 41,903 | 0 | 41,903 |
| 0000076P5519 | 09BD | 20030831 | 41,903 | 10,000 | 31,903 |
| 0000076P5519 | 09BD | 20030930 | 31,903 | 0 | 31,903 |
| 0000076P5519 | 09BD | 20031031 | 31,903 | 10,000 | 21,903 |
| 0000076P5519 | 09BD | 20031130 | 21,903 | 0 | 21,903 |
| 0000076P5519 | 09BD | 20031231 | 21,903 | 0 | 21,903 |
| 0000076P5519 | 09BD | 20040131 | 21,903 | 0 | 21,903 |
| 0000076P5519 | 09BD | 20040229 | 21,903 | 0 | 21,903 |
| 0000076P5519 | 09BD | 20040331 | 21,903 | 0 | 21,903 |
| 0000076P5519 | 09BD | 20040430 | 21,903 | 0 | 21,903 |
| 0000076P5519 | 09BD | 20040531 | 21,903 | 0 | 21,903 |
| 0000076P5519 | 09BD | 20040630 | 21,903 | 0 | 21,903 |
| 0000076P5519 | 09BD | 20040731 | 21,903 | 10,000 | 11,903 |

FIG. 11

| PN | Site | Date | Category | Existing | Optimum | Excess |
|---|---|---|---|---|---|---|
| 0000076P5519 | 09BD | 20030731 | Base | 41,903 | 0 | 41,903 |
| 0000076P5519 | 09BD | 20031031 | ST | 31,903 | 10,000 | 21,903 |
| 0000076P5519 | 09BD | 20040131 | MT | 21,903 | 0 | 21,903 |
| 0000076P5519 | 09BD | 20040731 | LT | 21,903 | 10,000 | 11,903 |

FIG. 12

| PN | Site | Bucket Date | Existing | Optimum | Excess |
|---|---|---|---|---|---|
| 0000076P5519 | 09BD | 20030725 | 41,903 | 0 | 41,903 |
| 0000076P5519 | 09BD | 20030731 | 41,903 | 0 | 41,903 |
| 0000076P5519 | 09BD | 20030831 | 41,903 | 10,000 | 31,903 |
| 0000076P5519 | 09BD | 20030930 | 31,903 | 0 | 31,903 |
| 0000076P5519 | 09BD | 20031031 | 31,903 | 10,000 | 21,903 |
| 0000076P5519 | 09BD | 20031130 | 21,903 | 0 | 21,903 |
| 0000076P5519 | 09BD | 20031231 | 21,903 | 0 | 21,903 |
| 0000076P5519 | 09BD | 20040131 | 21,903 | 0 | 21,903 |
| 0000076P5519 | 09BD | 20040229 | 21,903 | 0 | 21,903 |
| 0000076P5519 | 09BD | 20040331 | 21,903 | 0 | 21,903 |
| 0000076P5519 | 09BD | 20040430 | 21,903 | 0 | 21,903 |
| 0000076P5519 | 09BD | 20040531 | 21,903 | 0 | 21,903 |
| 0000076P5519 | 09BD | 20040630 | 21,903 | 0 | 21,903 |
| 0000076P5519 | 09BD | 20040731 | 21,903 | 10,000 | 11,903 |

FIG. 13

| Data<br>Inventory Consumption | OT | PT | PO |
|---|---|---|---|
| ST | 10,000 | 10,000 | 20,000 |
| MT | 0 | 10,000 | 0 |
| LTA | 20,000 | 10,000 | 10,000 |
| LTI | 11,903 | 11,903 | 11,903 |

TOTAL INVENTORY MANAGEMENT

BACKGROUND OF THE INVENTION

1. Technical Field

The present invention relates generally to inventory management, and more particularly, to a total inventory management system.

2. Related Art

Traditionally, solutions to inventory management, or excess management, focus strictly on inventory management in terms of either purchasing decisions, resource planning, or the necessity for scrap. For example, Agarwal et al. (Pub. No. U.S. 2003/0101107 A1) analyze a supply chain network to provide an optimal inventory level. Hayes (Pub. No. U.S. 2002/0178092 A1) provides a system to manage inventory based on cumulative demands for each of a plurality of time periods. Brockman (U.S. Pat. No. 5,884,300) provides a solution which compensates for consumption of inventory by maintaining a constant daily inventory size.

There are also some existing inventions that are related to estimating excess inventory, e.g., Kagami et al. (U.S. Pat. No. 5,237,496), Salvo et al. (U.S. Pat. No. 6,341,271) and Rand et al. (U.S. Pat. No. 5,960,414). However, those existing references estimate excess inventory based on only one time period—whether that be a specified date, or over the forecasted future—but not multiple time points and periods. In addition, those references only focus upon purchased stock rather than the entire bill of materials and components. Moreover, these references focus only on excess inventory and none deal with an optimal amount of inventory that is necessary to meet consumer requirements. Furthermore, none of the prior references identify an amount of inventory that is delayed in manufacturing yet is required to meet consumer requirements.

In view of the foregoing, there is a need for a method to identify and manage a total inventory including an optimal amount of inventory that is necessary to meet consumer requirements and an excess inventory exceeds consumer requirements. Also there is a need for a method to determine an amount of inventory that is delayed in manufacturing yet is required to meet consumer requirements. There is also need for a method to manage inventory for both finished goods and for components for multiple time points and periods.

SUMMARY OF THE INVENTION

The invention includes a method, system and program product to manage inventory. Existing inventory, optimum inventory, excess inventory and inventory consumption are calculated according to different sets of data regarding whether one is considering a policy inventory and/or a manufacturing limitation. Results of the calculations with different sets of data are compared to determine an impact of the policy inventory and an inventory trapped in manufacturing. This invention has application in the microelectronics industry as well as other industries.

A first aspect of the invention is directed to a method of managing inventory, the method comprising the steps of: selecting an analysis duration and at least one analysis point within the analysis duration; determining an excess inventory with consideration of a manufacturing limitation and an excess inventory without consideration of the manufacturing limitation for each analysis point; determining a trapped inventory based on a difference between the excess inventory with consideration of the manufacturing limitation and the excess inventory without consideration of the manufacturing limitation; and determining an impact of a policy inventory on an inventory consumption.

A second aspect of the invention is directed to a system for managing inventory, the system comprising: means for selecting an analysis duration and at least one analysis point within the analysis duration; means for determining an excess inventory with consideration of a manufacturing limitation and an excess inventory without consideration of the manufacturing limitation for each analysis point; means for determining a trapped inventory based on a difference between the excess inventory with consideration of the manufacturing limitation and the excess inventory without consideration of the manufacturing limitation; and means for determining an impact of a policy inventory on an inventory consumption.

A third aspect of the invention is directed to a computer program product comprising a computer useable medium having computer readable program code embodied therein for reporting on performance of a plurality of parameters, the program product comprising: program code configured to select an analysis duration and at least one analysis point within the analysis duration; program code configured to determine an excess inventory with consideration of a manufacturing limitation and an excess inventory without consideration of the manufacturing limitation for each analysis point; program code configured to determine a trapped inventory based on a difference between the excess inventory with consideration of the manufacturing limitation and the excess inventory without consideration of the manufacturing limitation; and program code configured to determine an impact of a policy inventory on an inventory consumption.

The foregoing and other features and advantages of the invention will be apparent from the following more particular description of preferred embodiments of the invention.

BRIEF DESCRIPTION OF THE DRAWINGS

The preferred embodiment of this invention will be described in details, with reference to the following figures, wherein like designations denote like elements, and wherein:

FIG. 3 shows a set of data including no policy inventory and considering a manufacturing limitation (OT Data);

FIG. 5 shows a result of an optimum inventory determination based on the data of FIG. 3;

FIG. 6 shows a result of an existing inventory and excess inventory calculation based on the data of FIG. 3 and the result of FIG. 5;

FIG. 7 shows a partition of FIG. 6 including records for bucket dates required for a calculation of inventory consumptions;

FIG. 8 shows a result of an existing inventory, optimum inventory and excess inventory calculation with a set of data including a policy inventory and considering a manufacturing limitation (PT Data);

FIG. 9 shows a partition of FIG. 8 including records for bucket dates required for a calculation of inventory consumptions;

FIG. 10 shows a result of an existing inventory, optimum inventory and excess inventory calculation with a set of data including a policy inventory and considering no manufacturing limitation (PO Data);

FIG. 11 shows a partition of FIG. 10 including records for bucket dates required for the calculation of inventory consumptions;

FIG. 12 shows a result of an existing inventory, optimum inventory and excess inventory calculation with a set of data including no policy inventory and considering no manufacturing limitation (OO Data); and FIG. 13 shows a comparison of the inventory consumptions calculated with the set of data including no policy inventory and considering a manufacturing limitation (OT Data), the set of data including a policy inventory and considering a manufacturing limitation (PT Data) and the set of data including a policy inventory and considering no manufacturing limitation (PO data).

DETAILED DESCRIPTION OF THE INVENTION

1. Definitions

For purpose of description, the following terminology will be employed:

"Analysis duration" is a time period, based upon which an analysis is conducted.

"Beginning date" is the date an analysis duration starts.

"Beginning inventory" is an amount of inventory that exists on the beginning date.

"Bucket date" is a point of time within an analysis duration, which is used for selecting data for analysis, e.g., if data at Jul. 31, 2003 is selected for analysis, Jul. 31, 2003 is a bucket date.

"Cycle time" is a period of time after each bucket date, e.g., if Jul. 31, 2003 is selected as a bucket date, Aug. 1, 2003-Aug. 5, 2003 may be selected as a cycle time.

"Demand" is an amount of inventory that is required to be shipped to a consumer at a specific time.

"Excess inventory" is an amount of inventory that exceeds consumer requirements at a specific time.

"Existing inventory" is an amount of inventory that exists at a specific point of time.

"Inventory consumption" is an amount of inventory planned to be consumed in a specified period of time.

"Inventory data" is information related to a total amount of inventory, including, but not limited to, demand, receipt inventory and policy inventory.

"Long term inventory" is an amount of inventory that is not planned to be consumed in an analysis duration.

"Manufacturing limitation" is any limitation that delays the manufacturing of an inventory, e.g., governmental restraint and manufacturing capacity.

"Optimum inventory" is an amount of inventory that is required to fulfill a customer requirement occurring in a cycle time.

"Policy inventory" is an amount of an inventory required to fulfill a plan to manage inventory or to satisfy a customer requirement in a swift and/or efficient way, e.g., a plan to ship goods to a consumer earlier than the required shipping date.

"Post-processing information" is information not directly related to an amount of inventory, yet is required for decision making regarding inventory size, e.g., manufacturing cost.

"Receipt inventory" is an amount of an inventory that is received at a specific time.

"Short term," "mid term" and "long term" are partitions of an analysis duration which are selected to calculate inventory consumptions.

"Total optimum inventory" is an accumulation of optimum inventories for a certain period.

"Trapped inventory" is an amount of inventory that is delayed in manufacturing due to certain manufacturing limitations, yet is required to fulfill customer requirements.

2. System Overview

Figure 1:
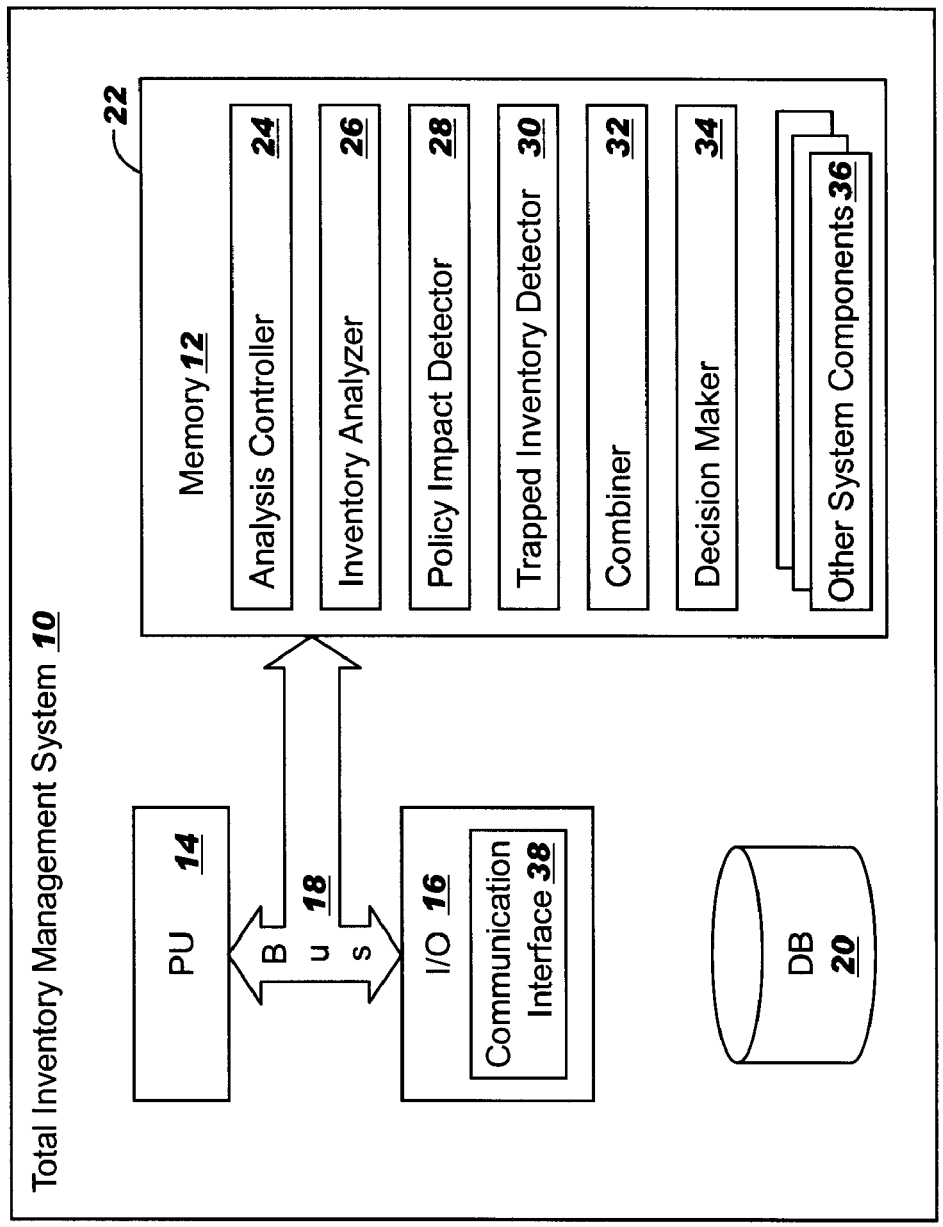
FIG. 1 shows a block diagram of a total inventory management system in accordance with one embodiment of the invention.

With reference to the accompanying drawings, FIG. 1 is a block diagram of total inventory management (TIM) system 10 in accordance with the invention. TIM system 10 preferably includes a memory 12, a processing unit (PU) 14, input/output devices (I/O) 16 and a bus 18. A database 20 may also be provided for storage of data relative to processing tasks. Memory 12 preferably includes a program product 22 that, when executed by PU 14, comprises various functional capabilities described in further detail below. Memory 12 (and database 20) may comprise any known type of data storage system and/or transmission media, including magnetic media, optical media, random access memory (RAM), read only memory (ROM), a data object, etc. Moreover, memory 12 (and database 20) may reside at a single physical location comprising one or more types of data storage, or be distributed across a plurality of physical systems. PU 14 may likewise comprise a single processing unit, or a plurality of processing units distributed across one or more locations. I/O 16 may comprise any known type of input/output device including a network system, modem, keyboard, mouse, scanner, voice recognition system, CRT, printer, disc drives, etc. Additional components, such as cache memory, communication systems, system software, etc., may also be incorporated into system 10.

As shown in FIG. 1, program product 22 may include an analysis controller 24, an inventory analyzer 26, a policy impact detector 28, a trapped inventory detector 30, a combiner 32, a decision maker 34 and other system components 36. Other system components 36 may include any complementary functions to TIM system 10 not explicitly delineated below.

As also shown in FIG. 1, I/O 16 may include a communication interface 38 to enable the system to communicate with a user during operation.

In operation, TIM system 10 determines an optimal amount of inventory that is necessary to meet customer requirements (optimum inventory), an amount of inventory that exceeds customer requirements (excess inventory), an amount of inventory that is expected to be consumed (inventory consumption) and an amount of inventory that is no longer required. TIM system 10 also determines an impact of an amount of inventory that is used as a policy to balance serviceability requirements to a customer in a swift and efficient way. TIM system 10 also determines an amount of inventory that is delayed in manufacturing due to certain limitations, yet is required to fulfill customer requirements. Thus, TIM system 10 provides a user with the ability to plan a preferable inventory size and highlight risky inventory which may/should be reduced to accurately reflect the inventory position to, e.g., shareholders. TIM system 10 also allows a user to access the amount of risk the user is choosing to take by maintaining an inventory beyond the optimal amount. In summary, TIM system 10 facilitates clear decision making regarding inventory management.

3. Methodology

Figure 2:
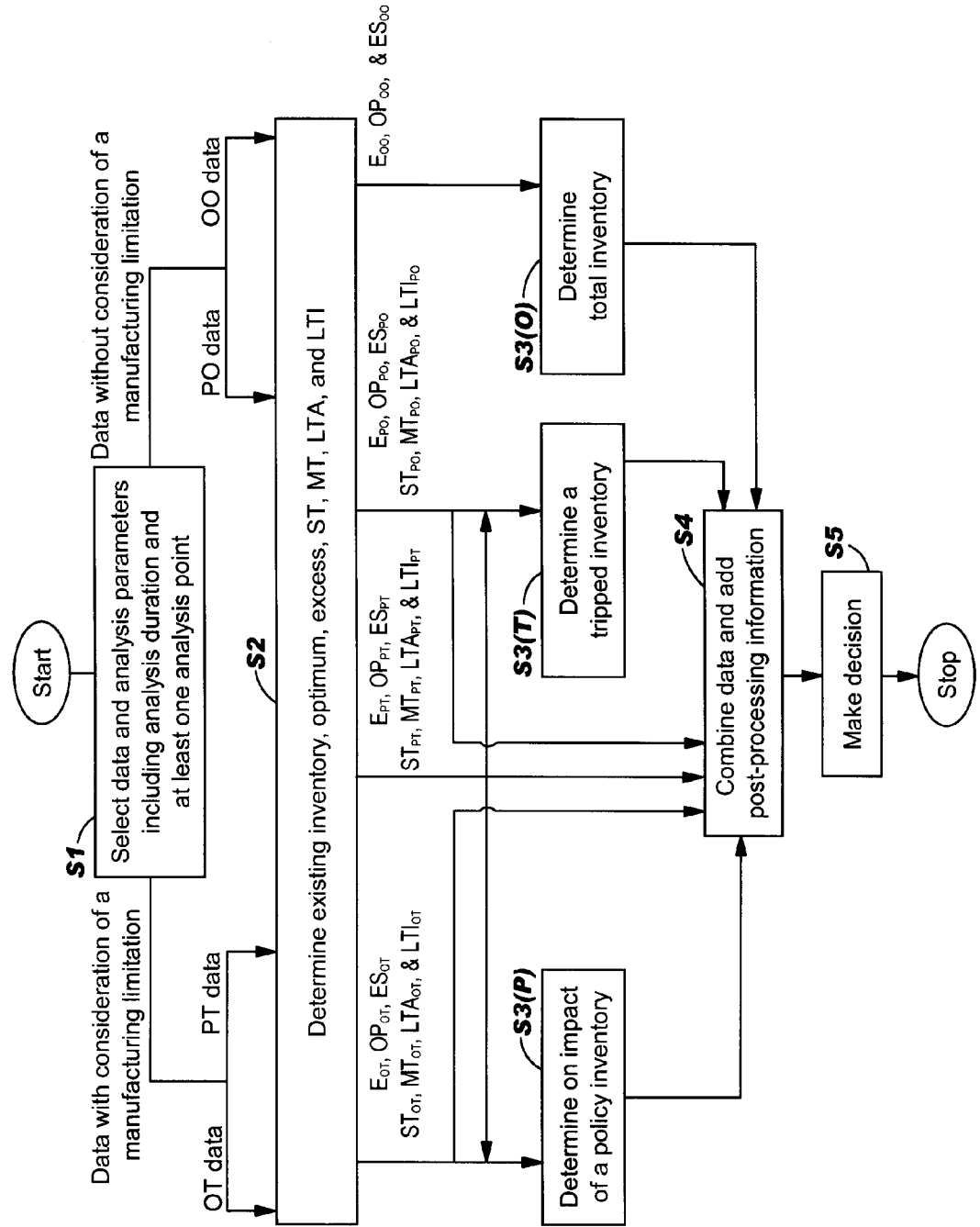
FIG. 2 shows a flow diagram of a method in accordance with one embodiment of the invention.

Operation of TIM system 10 and implementation of a method according to one embodiment of the invention will be described relative to FIGS. 2-13. FIG. 2 shows a flow of the operation of TIM system 10 (FIG. 1) according to one embodiment. The operation of TIM system 10 (FIG. 1) begins with analysis controller 24 (FIG. 1), at step S1, selecting inventory data for analysis. Generally, there are four sets of inventory data: (1) inventory data including a policy inventory and considering a manufacturing limitation, hereinafter "policy and trapped (PT) data," (2) inventory data including no policy inventory and considering a manufacturing limitation, hereinafter "trapped only (OT) data," (3) inventory data including a policy inventory and considering no manufacturing limitation, hereinafter "policy only (PO) data" and (4) inventory data including no policy inventory and considering no manufacturing limitation, hereinafter "bare (OO) data." Analysis controller 24 (FIG. 1) always selects at least one of the policy and trapped (PT) data and the trapped only (OT) data for analysis because in reality, manufacturing limitations always exist. Analysis controller 24 (FIG. 1) will select both the policy and trapped (PT) data and the trapped only (OT) data if a user needs to determine an impact of a policy inventory. The bare (OO) data will be selected to determine a total optimum inventory. The policy only (PO) data will be selected to determine a trapped inventory if the policy and trapped (PT) data is also selected; the bare (OO) data will be selected to determine a trapped inventory if the trapped only (OT) data is also selected; and if both the policy and trapped (PT) data and the trapped only (OT) data are selected, either the policy only (PO) data or the bare (OO) data may be selected to determine a trapped inventory.

For description purposes, analysis controller 24 (FIG. 1) is assumed to select all four sets of data for analysis. FIG. 3 shows an exemplary set of trapped only (OT) data to be used for describing the operation of TIM system 10 (FIG. 1). The policy and trapped (PT) data, policy only (PO) data and bare (OO) data used in the description will be described later in terms of their differences to the trapped only (OT) data of FIG. 3. As shown in FIG. 3, the part number for the specific inventory is 0000076P5519. The data is for office site number 09BD. The data record types include beginning inventory and demand. The beginning date for analysis is Jul. 25, 2003 which is also the date of the beginning inventory.

Returning to FIG. 2, at step S1, analysis controller 24 (FIG. 1) also sets analysis parameters including an analysis duration and at least one analysis point (bucket date) within the analysis duration for an analysis of the selected inventory data. The parameters also include, but are not limited to, cycle time, short term, mid term and long term. The selection of analysis parameters may be based on inventory type, consumer requirements, firm policies or other factors preset by a user. For example, the selection of the cycle time, which is used to determine an optimum inventory, may be based on a time period required for manufacturing an inventory, e.g., the time required for assembling components into finished goods. If for example, it takes 5 days for a company to assemble components into finished goods, analysis controller 24 (FIG. 1) may select 5 days as the cycle time (for a bucket date). The reason is that on each bucket date, a consumer requirement within the 5 days cycle time cannot be fulfilled by assembling components into finished goods and must be fulfilled using existing inventory that exists on the bucket date and the amount of the existing inventory used to meet the requirement is an optimum inventory on the bucket date. The selection of an analysis point, hereinafter "bucket date," can be based on convenience considerations. For example, the end of a month is usually the date for inventory clearing, accounting and planning and can be conveniently selected as the bucket date. For purposes of description, for example, analysis controller 24 (FIG. 1), at step S1, may select 12 months for the analysis duration, here from Jul. 25, 2003 to Jul. 31, 2004. A bucket date is the last day of each month within the 12 month duration, here Jul. 31, 2003, Aug. 31, 2003, Sep. 30, 2003, Oct. 31, 2003, Nov. 30, 2003, Dec. 31, 2003, Jan. 31, 2004, Feb. 29, 2004, Mar. 31, 2004, Apr. 30, 2004, May 31, 2004, Jun. 6, 2004, Jul. 31, 2004; a cycle time is selected as the five days after each bucket date, i.e., the first 5 days of each month, assuming that it takes 5 days for a company to assemble components into an inventory of finished goods; short term is selected as the first 3 months from the beginning date, here from Jul. 25, 2003 to Oct. 31, 2003; mid term is selected as the second 3 months from the beginning date, here from Oct. 31, 2003 to Jan. 31, 2004; and the long term is selected as the final 6 months, here from Jan. 1, 2004 to Jul. 31, 2004. It is appreciated that any selection and combination of analysis parameters are included in the current invention. In addition, although the description is based on an inventory of finished goods, it is appreciated that the current invention can also be applied to components management.

Continuing with FIG. 2, next, at step S2, inventory analyzer 26 (FIG. 1) determines, inter alia, an excess inventory with consideration of a manufacturing limitation and an excess inventory without consideration of the manufacturing limitation for each analysis point (bucket date). At step S2, inventory analyzer 26 (FIG. 1) also determines an excess inventory with consideration of a policy inventory and an excess inventory without consideration of the policy inventory.

Specifically, inventory analyzer 26 (FIG. 1), at step S2, analyzes each selected data set, here the policy and trapped (PT) data, policy only (PO) data, trapped only (OT) data and the bare (OO) data, separately according to a same procedure, except for the bare (OO) data. The bare (OO) data is excluded, for purpose of description, for example, because it is only used to determine a total optimum inventory which, as described later, does not need to go through the whole procedure of step S2.

Figure 4:
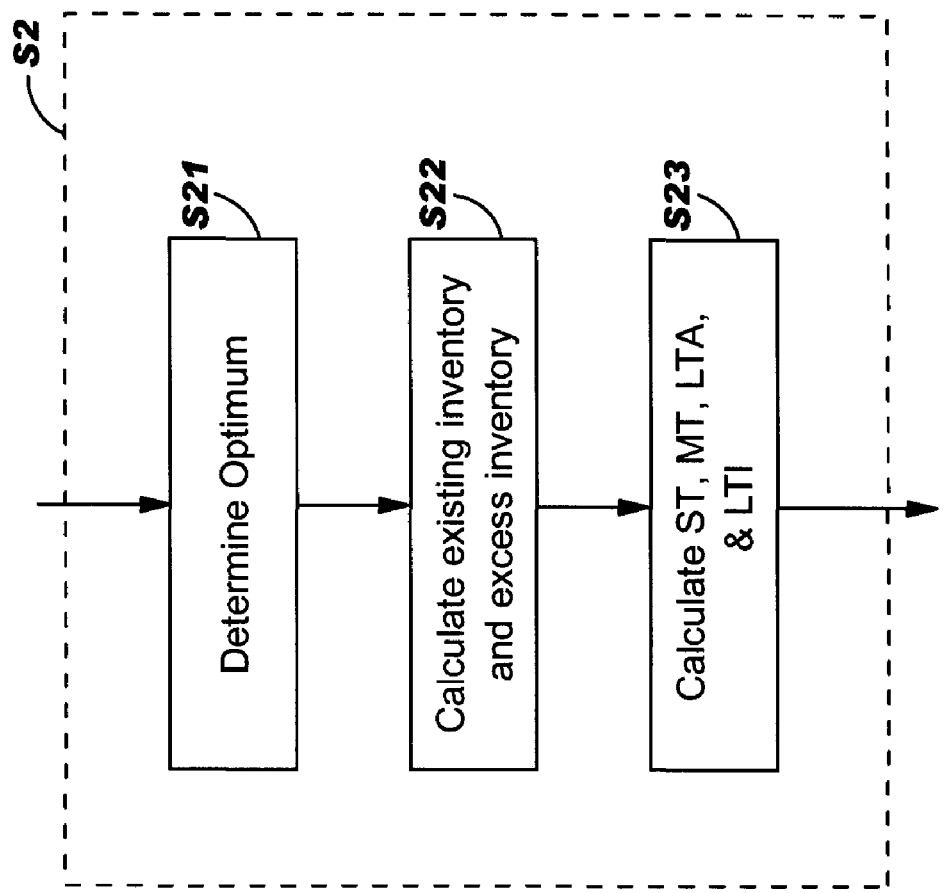
FIG. 4 shows details of a step of the flow diagram of FIG. 2.

The analysis procedure, at step S2, includes three stepwise sub-steps shown on FIG. 4. The operation of the three sub-steps—S21, S22 and S23—are described below in details according to the analysis with the trapped only (OT) data shown in FIG. 3. Because the same analysis procedures are also conducted with the policy and trapped (PT) data and the policy only (PO) data and partly with the bare (OO) data, the analysis, at step S2 (FIG. 2), with the policy and trapped (PT) data, the policy only (PO) data and the bare (OO) data will not be described in detail and only the results of those analysis will be provided.

Staying with FIG. 4, at step S21, inventory analyzer 26 (FIG. 1) determines an optimum inventory for each bucket date with each data set selected. An optimum inventory is a demand occurring (being shipped) within the (e.g., 5 day) cycle time for each bucket date, including the bucket date. If a demand occurs more than 5 days after the beginning of the month in which it occurs, the demand is not a part of the optimum inventory on the bucket date of the preceding month because assembly of the goods to fulfill the demand needs 5 days and at the end of the preceding month (bucket date), a company does not need to have an inventory to meet this specific demand. That is, a company can have only components, and assembles the components to meet the demand. And the demand is also not part of the optimum inventory on the bucket date of the month in which the demand occurs since the goods to fulfill the demand have already been shipped by the end of the month (bucket date) and therefore should be out of both an existing inventory and an optimum inventory. The determination of an optimum inventory enables a company to maintain an optimal (no more, no less) amount of inventory at a specific time to fulfill consumer requirements.

Based on the trapped only (OT) data shown in FIG. 3, inventory analyzer 26 (FIG. 1) determines the optimum inventories shown in FIG. 5. Here only the demand occurring on Jul. 31, 2004, within the five day cycle time of Jul. 31, 2004, qualifies as an optimum inventory, while the demands occurring on Oct. 10, 2003 and Feb. 14, 2004 do not qualify as optimum inventories because they occur outside the five day cycle time for bucket date Sep. 30, 2003 and bucket date Jan. 31, 2004.

Continuing with FIG. 4, next, at step S22, inventory analyzer 26 (FIG. 1) calculates an existing inventory and an excess inventory. An existing inventory is the amount of inventory that exists at a specific point of time, here a bucket date. An excess inventory is the amount of inventory that exceeds consumer requirements at a specific time, here a bucket date. On each bucket date, only the optimum inventory is required to fulfill consumer requirements, or in other words, only demands occurring within the 5 days cycle time needs to be met with the existing inventory because demands occurring more than 5 days from a bucket date can be met by assembling components. So, an excess inventory on each bucket date equals the existing inventory minus the optimum inventory. It is evident that an excess inventory can be either a positive number, which means an existing inventory exceeds an amount necessary to fulfill consumer requirements, or a negative number, which means the existing inventory is not enough to fulfill consumer requirements.

FIG. 6 shows the table of existing inventory, optimum and excess inventory calculated by inventory analyzer 26 (FIG. 1) at step S22 (FIG. 4). Here, although the demands that occur on Oct. 30, 2003 and Feb. 14, 2004 do not qualify as optimum inventories, they affect the existing inventories of the bucket date of the months that they occur because at those bucket dates, the amounts of the inventory have already been shipped and are out of the existing inventory. For example, the demand that occurs on Oct. 30, 2003 does not qualify as an optimum inventory on both bucket dates Sep. 30, 2003 and Oct. 31, 2003, but it is subtracted from the excess inventory at bucket date Sep. 30, 2003 to obtain the existing inventory on bucket date Oct. 31, 2003. As a consequence, the excess inventory on bucket date Oct. 31, 2003 is also affected by this demand. So basically, if a demand qualifies as an optimum inventory, its effect on excess inventory will be recorded on the bucket date of the month before the demand occurs. If a demand does not qualify as an optimum inventory, its effect will be recorded on the bucket date of the month the demand occurs. This difference will affect later calculations of inventory consumptions.

Returning to FIG. 4, next, at step S23 (FIG. 4), inventory analyzer 26 (FIG. 1) calculates inventory consumptions in terms of inventory that will be consumed in the short term, hereinafter "short term consumption (ST)," inventory that will be consumed in the mid term, hereinafter "mid term consumption (MT)," inventory that will be consumed in the long term, hereinafter "long term consumption (LTA)" and inventory not consumed in a period of time (the analysis duration), herein after "long term inventory (LTI)." The calculations are based on the excess inventory on the bucket date at the end of each term and the bucket date of the month of the beginning date, which are selected at step S1 (FIG. 2) by analysis controller 24 (FIG. 1). For the purpose of description, the bucket date of the month of the beginning date is identified as "base bucket (Base);" the bucket date for the short term is identified as "short term bucket (STB);" the bucket date for the mid term is identified as "mid term bucket (MTB);" and the bucket date for the long term is identified as "long term bucket (LTB)." For purpose of description, as described before, analysis controller 24 (FIG. 1), at step S1 (FIG. 2), selects the first 3 months after the beginning date as the short term, the second 3 months after the beginning date as the mid term, and the last 6 month in the analysis duration as the long term. The beginning date is Jul. 25, 2003, which is more than 5 days after the beginning of July, 2003, so the base bucket (Base) for the calculation is Jul. 31, 2003 instead of Jun. 30, 2003. The short term bucket (STB) is Oct. 31, 2003; the mid term bucket (MTB) is Jan. 31, 2004; and the long term bucket (LTB) is Jul. 31, 2004. FIG. 7 is a partition of FIG. 6, which shows the existing inventory, optimum inventory and excess inventory on those required bucket dates.

Continuing with FIG. 4, the calculations of inventory consumption, at step S23, are based on the following algorithms:

$$ST = \max(0, EX_{Base} - EX_{STB})$$

$$MT = \max(0, EX_{Base} - EX_{MTB} - ST)$$

$$LTA = \max(0, EX_{Base} - EX_{LTB} - ST - MT)$$

$$LTI = \max(0, EX_{Base} - ST - MT - LTA)$$

Wherein $EX_{Base}$ is the excess inventory on the base bucket (Base), $EX_{STB}$ is the excess inventory on the short term bucket (STB), $EX_{MTB}$ is the excess inventory on the mid term bucket (MTB) and $EX_{LTB}$ is the excess inventory on the long term bucket (LTB).

Incorporating the values of FIG. 7 into the above equations, inventory analyzer 26 (FIG. 1) obtains:

$$ST = \max(0, 41{,}903 - 31{,}903) = 10{,}000$$

$$MT = \max(0, 41{,}903 - 31{,}903 - 10{,}000) = 0$$

$$LTA = \max(0, 41{,}903 - 11{,}903 - 10{,}000 - 0) = 20{,}000$$

$$LTI = \max(0, 41{,}903 - 10{,}000 - 0 - 20{,}000) = 11{,}903$$

Returning to FIG. 2, the above described step 2 analysis procedures, i.e. steps S21, S22 and S23 of FIG. 4, which are described with the trapped only (OT) data, are also conducted with the policy and trapped (PT) data and the policy only data (PO) and partly with the bare (OO) data.

For purposes of description, the policy and trapped (PT) data is assumed to be the combination of the trapped only (OT) data and a policy inventory. For purpose of description, for example, the policy is to ship the Feb. 14, 2004 demand of the trapped only (OT) data (FIG. 3) ten days early, which puts the demand into the 5 day cycle time of the bucket date Jan. 31, 2004. As a consequence, this demand now qualifies as an optimum inventory determined at step S21 (FIG. 4). FIG. 8 shows the results of the existing inventory, optimum inventory and excess inventory calculated with the policy and trapped (PT) data at step S22 (FIG. 4). FIG. 9 is a partition of FIG. 8 that includes the records for the bucket dates: base bucket (Base), short term bucket (STB), mid term bucket (MTB) and long term bucket (LTB).

Continuing with FIGS. 2 and 4, at step S2, analysis steps S21-S22 (FIG. 4) are also conducted with the policy only (PO) data. For purpose of description, for example, inventory analyzer 26 (FIG. 1) conducted steps S21-S22 with the policy only (PO) data and obtains the existing inventory, optimum inventory and excess inventory shown in FIG. 10. FIG. 11 is a partition of FIG. 10 that includes the records for the bucket dates: base bucket (Base), short term bucket (STB), mid term bucket (MTB) and long term bucket (LTB).

Continuing with FIGS. 2 and 4, at step S2, analysis steps S21-S22 (FIG. 4) are also conducted with the bare (OO) data. For purpose of description, for example, inventory analyzer 26 (FIG. 1) conducts step S21-22 with the bare (OO) data and obtains the existing inventory, optimum inventory and excess inventory shown in FIG. 12. Here there is no difference between FIG. 10 (of policy only (PO) data) and FIG. 12 (of bare (OO) data) because due to the removal of manufacturing limitations from the policy and trapped (PT) data, the demands that originally will be shipped (occur) on Oct. 30, 2003 and Feb. 14, 2004 now will be shipped (occur) on Aug. 31, 2003 and Oct. 31, 2003 respectively, which makes the policy that ships the Feb. 14, 2004 demand 10 days early moot. So the application of the policy here makes no difference between the policy only (PO) data and the bare (OO) data.

Returning to FIG. 4, with the policy and trapped (PT) data and the policy only (PO) data, inventory analyzer 26 (FIG. 1) also calculates inventory consumptions at step S23 and obtains results shown in FIG. 13. According to the current embodiment, inventory analyzer 26 (FIG. 1) does not conduct step S23 with the bare (OO) data because it is not necessary for the determination of a total optimum inventory that the bare (OO) data is used for. However, it is evident that an inventory consumption calculation with the bare (OO) data is also included in the current invention.

Returning to FIG. 2, the results of the analysis with the trapped only (OT) data, at step S2, are marked as $E_{OT}$ for the existing inventory, $OP_{OT}$ for the optimum inventory, $ES_{OT}$ for the excess inventory, $ST_{OT}$ for the short term consumption (ST), $MT_{OT}$ for the mid term consumption (MT), $LTA_{OT}$ for the long term consumption (LTA) and $LTI_{OT}$ for the long term inventory (LTI). Similarly, the results of the analysis with the policy and trapped (PT) data, at step S2, are marked as $E_{PT}$ for the existing inventory, $OP_{PT}$ for the optimum inventory, $ES_{PT}$ for the excess inventory, $ST_{PT}$ for the short term consumption (ST), $MT_{PT}$ for the mid term consumption (MT), $LTA_{PT}$ for the long term consumption (LTA) and $LTI_{PT}$ for the long term inventory (LTI). Similarly, the results of the analysis with the policy only (PO) data, at step S2, are marked as $E_{PO}$ for the existing inventory, $OP_{PO}$ for the optimum inventory, $ES_{PO}$ for the excess inventory, $ST_{PO}$ for the short term consumption (ST), $MT_{PO}$ for the mid term consumption (MT), $LTA_{PO}$ for the long term consumption (LTA) and $LTI_{PO}$ for the long term inventory (LTI). Further, the results of the analysis with the bare (OO) data, at step S2, are marked as $E_{OO}$ for the existing inventory, $OP_{OO}$ for the optimum inventory, $ES_{OO}$ for the excess inventory.

The results of step S2 (FIG. 2) are useful both for decision making regarding inventory management and for the further analyses at step S3, as later described. For example, the results of long term inventory (LTI) of step S2 may provide a user with the amount of inventory that is at risk of waste. The results of the excess inventory remind a user to increase or decrease existing inventory. The results of the short term consumption, mid term consumption and long term consumption provide a user with trends of consumer requirements. In addition, the results of step S2 are used for the determination of an impact of the policy inventory, a trapped inventory and a total optimum inventory at step S3 (FIG. 2) as will be described below.

Continuing with FIG. 2, after inventory analyzer 26 (FIG. 1) finishes the calculations, at step S2, for the 4 sets of data, TIM system 10 (FIG. 1) proceeds to step S3, which includes three independent steps—step S3(P) that determines an impact of a policy inventory, S3(T) that determines a trapped inventory and step S3(O) that determines a total optimum inventory.

Continuing with FIG. 2, at step S3(P), policy impact detector 28 (FIG. 1) determines a policy impact based on a difference between the excess inventory with consideration of the policy inventory and the excess inventory without consideration of the policy inventory. Specifically policy impact detector 28 (FIG. 1) compares the difference between the inventory consumptions calculated (based on the excess inventory) with the policy and trapped (PT) data and the inventory consumptions calculated with the trapped only (OT) data according to the following algorithms:

$$ST\text{-}P = \max(0, ST_{OT} - ST_{PT})$$

$$MT\text{-}P = \max(0, MT_{OT} - MT_{PT})$$

$$LTA\text{-}P = \max(0, LTA_{OT} - LTA_{PT})$$

$$LTI\text{-}P = \max(0, LTI_{OT} - LTI_{PT})$$

and:

$$ST\text{-}O = ST_{OT} - ST\text{-}P$$

$$MT\text{-}O = MT_{OT} - MT\text{-}P$$

$$LTA\text{-}O = LTA_{OT} - LTA\text{-}P$$

$$LTI\text{-}O = LTI_{OT} - LTI\text{-}P$$

Wherein $ST_{OT}$, $MT_{OT}$, $LTA_{OT}$ and $LTI_{OT}$ are the short term consumption (ST), mid term consumption (MT), long term consumption (LTA) and long term inventory (LTI) calculated with the trapped only (OT) data; $ST_{PT}$, $MT_{PT}$, $LTA_{PT}$ and $LTI_{PT}$ are the short term consumption (ST), mid term consumption (MT), long term consumption (LTA) and long term inventory (LTI) calculated with the policy and trapped (PT) data; ST-O, MT-O, LTA-O and LTI-O are parts of the $ST_{OT}$, $MT_{OT}$, $LTA_{OT}$ and $LTI_{OT}$ that are not affected by the policy; and ST-P, MT-P, LTA-P and LTI-P are parts of the $ST_{OT}$, $MT_{OT}$, $LTA_{OT}$ and $LTI_{OT}$ that are affected by the policy. Obtaining ST-P, MT-P, LTA-P and LTI-P, a user of TIM system 10 (FIG. 1) can determine the impact of the policy.

Incorporating the values obtained at step S2, as shown in FIG. 13, policy impact detector 28 (FIG. 1) obtains:

$$ST\text{-}P = \max(0, 10{,}000 - 10{,}000) = 0$$

$$MT\text{-}P = \max(0, 0 - 10{,}000) = 0$$

$$LTA\text{-}P = \max(0, 20{,}000 - 10{,}000) = 10{,}000$$

$$LTI\text{-}P = \max(0, 11{,}903 - 11{,}903) = 0$$

and $$ST\text{-}O = 10{,}000 - 0 = 10{,}000$$

$$MT\text{-}O = 0 - 0 = 0$$

$$LTA\text{-}O = 20{,}000 - 10{,}000 = 10{,}000$$

$$LTI\text{-}O = 11{,}903 - 0 = 11{,}903$$

According to the result, the impact of the policy—shipping the Feb. 14, 2004 demand of the trapped only (OT) data of FIG. 3 ten days early—is on the long term consumption of the inventory, because 10,000 pieces of inventory planned to be consumed in the long term are affected by the policy and is consumed in the short term instead (See FIG. 13).

Continuing with FIG. 2, at step S3(T), trapped inventory detector 30 (FIG. 1) determines a trapped inventory based on a difference between the excess inventory with consideration of a manufacturing limitation and the excess inventory without consideration of a manufacturing limitation. Specifically, trapped inventory detector 30 (FIG. 1) compares the inventory consumptions calculated (based on the excess inventory), at step S2, with the policy and trapped (PT) data with the inventory consumptions calculated, at step S2, with the policy only (PO) data. It is evident that a comparison between the step S2 results calculated with the trapped only (OT) data and the step S2 results calculated with the bare (OO) data is also included in the current invention.

Continuing with FIG. 2, according to the current embodiment, trapped inventory detector 30 (FIG. 1), determines a trapped inventory, at step S3(T), according to the following algorithms:

$$ST\text{-}T=\max(0, ST_{PO}-ST_{PT})$$

$$MT\text{-}T=\max(0, MT_{PO}-MT_{PT})$$

$$LTA\text{-}T=\max(0, LTA_{PO}-LTA_{PT})$$

$$LTI\text{-}T=\max(0, LTI_{PO}-LTI_{PT})$$

and:

$$ST\text{-}O=ST_{PO}-ST\text{-}T$$

$$MT\text{-}O=MT_{PO}-MT\text{-}T$$

$$LTA\text{-}O=LTA_{PO}-LTA\text{-}T$$

$$LTI\text{-}O=LTI_{PO}-LTI\text{-}T$$

Wherein ST-T, MT-T, LTA-T and LTI-T are part of the short term consumption, mid term consumption, long term consumption and long term inventory which are delayed in manufacturing due to various manufacturing limitations and yet are required to fulfill consumer requirements; and ST-O, MT-O, LTA-O and LTI-O are part of the short term consumption, mid term consumption, long term consumption and long term inventory which are not delayed in manufacturing Incorporating the values of FIG. 13, trapped inventory detector 30 (FIG. 1), at step S3(T), obtains:

$$ST\text{-}T=\max(0, 20{,}000-10{,}000)=10{,}000$$

$$MT\text{-}T=\max(0, 0-10{,}000)=0$$

$$LTA\text{-}T=\max(0, 10{,}000-10{,}000)=0$$

$$LTI\text{-}T=\max(0, 11{,}903-11{,}903)=0$$

and $$ST\text{-}O=20{,}000-10{,}000=10{,}000$$

$$MT\text{-}O=0-0=0$$

$$LTA\text{-}O=10{,}000-0=10{,}000$$

$$LTI\text{-}O=11{,}903-0=11{,}903$$

According to the results, in short term there is an inventory of 10,000 that is delayed in manufacturing and is yet required to fulfill consumer requirements. Due to the delay, in the short term, only 10,000 pieces of inventory, instead of 20,000 pieces, are consumed (See FIG. 13). That is, in short term, 10,000 pieces are not available due to manufacturing limitations, which could otherwise be consumed. Results show that that 10,000 pieces are consumed in the mid term instead (See FIG. 13).

The results also show that in the short term, there is an inventory consumption of 10,000 pieces that is not affected by the manufacturing limitations. That is, in short term, a consumer demand of 10,000 is not delayed due to the manufacturing limitations.

Continuing with FIG. 2, at step S3(O), inventory analyzer 26 (FIG. 1) determines a total optimum inventory based on the optimum inventory on each bucket date by grouping the optimum inventories on each bucket date calculated with the bare (OO) data ($OP_{OO}$) into a total optimum inventory for the whole analysis duration or sub-total optimum inventories for the short term, mid-term and long term.

Continuing with FIG. 2, at step S4, combiner 32 (FIG. 1) combines the results of step S2 calculated with the four sets of data and the results of step S3(P), S3(T) and S3(O) to generate a comprehensive result table. Further, at step S4, combiner 32 (FIG. 1) adds some post-processing information, such as cost and price, to the comprehensive result table. The comprehensive result table contains all the information required for decision making regarding an inventory.

Continuing with FIG. 2, at step S5, decisions regarding inventory size, e.g., manufacturing, purchase and scrap, are made based on, inter alia, the excess inventory, the trapped inventory and the impact of the policy inventory. The decision making can be done by decision maker 34 (FIG. 1) according to standards preset by a user of TIM system 10 (FIG. 1). Alternatively, the comprehensive result table generated at step S4 (FIG. 2) may be communicated to a user of TIM system 10 (FIG. 1) to enable the user to make the decision.

It is evident that during the operation of TIM system 10 (FIG. 1), any results obtained in steps S1-S3 can also be communicated to a user through communication interface 38 (FIG. 1) for the user to make decisions about inventory size and to evaluate the results and possibly to reset analysis parameters at step S1 and reiterate the operation of TIM system 10 (FIG. 1) accordingly.

CONCLUSION

In the previous discussion, it will be understood that the method steps discussed are performed by a processor, such as PU 14 of system 10, executing instructions of program product 22 stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method of managing inventory, the method comprising:
    selecting an analysis duration and at least one analysis point (AP) within the analysis duration;
    determining an excess inventory with a manufacturing limitation and an excess inventory without the manufacturing limitation for each analysis point using at least one computer;
    determining a trapped inventory (OT) based on a difference between the excess inventory with the manufacturing limitation and the excess inventory without the manufacturing limitation using the at least one computer;
    determining a policy inventory (P) using the at least one computer;
    determining a policy and trapped inventory (PT) based on a difference between the excess inventory with the manufacturing limitation and the policy inventory and the excess inventory without the manufacturing limitation using the at least one computer;
    determining an optimum inventory (O) for each analysis point based on the policy and trapped inventory (PT) and the trapped inventory (OT), for each analysis point using the at least one computer according to the following algorithms $$AP\text{-}P = \max(0, AP_{OT} - AP_{PT})$$

and:

$$AP\text{-}O = AP_{OT} - AP\text{-}P$$

wherein $AP_{OT}$, is the consumption calculated with the trapped only (OT) data; $AP_{PT}$, is the consumption calculated with the policy and trapped (PT) data; AP-O are part of the $AP_{OT}$, that is not affected by the policy inventory; and
    determining an impact of the policy inventory on an inventory consumption using the at least one computer.

2. The method of claim 1, further comprising selecting a cycle time after each analysis point.

3. The method of claim 2, wherein the cycle time is selected based on a time period required for manufacturing an inventory.

4. The method of claim 2, wherein the optimum inventory is a demand occurring within the cycle time.

5. The method of claim 1, further comprising determining a total optimum inventory based on the optimum inventory at each analysis point using the at least one computer.

6. The method of claim 1, further comprising determining an inventory that will be consumed in a short term, an inventory that will be consumed in a mid term, an inventory that will be consumed in a long term and an inventory that will not be consumed in a period of time, wherein the short term, mid term and long term are within the analysis duration using the at least one computer.

7. The method of claim 1, further comprising deciding an inventory size based on the excess inventory, the trapped inventory and the impact of the policy inventory.

8. The method of claim 1, wherein the excess inventory can be a negative number.

9. A system for managing inventory, the system comprising:
    means for selecting an analysis duration and at least one analysis point (AP) within the analysis duration;
    means for determining an excess inventory with a manufacturing limitation and an excess inventory without the manufacturing limitation for each analysis point;
    means for determining a trapped inventory (OT) based on a difference between the excess inventory with the manufacturing limitation and the excess inventory without the manufacturing limitation;
    means for determining a policy inventory (P);
    means for determining a policy and trapped inventory (PT) based on a difference between the excess inventory with the manufacturing limitation and the policy inventory and the excess inventory without the manufacturing limitation;
    means for determining an optimum inventory (O) for each analysis point based on the policy and trapped inventory (PT) and the trapped inventory (OT) for each analysis point using the at least one computer according to the following algorithms $$AP\text{-}P = \max(0, AP_{OT} - AP_{PT})$$

and:

$$AP\text{-}O = AP_{OT} - AP\text{-}P$$

wherein $AP_{OT}$, is the consumption calculated with the trapped only (OT) data; $AP_{PT}$, is the consumption calculated with the policy and trapped (PT) data; AP-O are part of the $AP_{OT}$, that is not affected by the policy inventory; and
    means for determining an impact of the policy inventory on an inventory consumption.

10. The system of claim 9, further comprising a means for determining a total optimum inventory based on the optimum inventory at each analysis point.

11. The system of claim 9, further comprising a means for determining an inventory that will be consumed in a short term, an inventory that will be consumed in a mid term, an inventory that will be consumed in a long term and an inventory that will not be consumed in a period of time, wherein the short term, mid term and long term are within the analysis duration.

12. A computer program product comprising a computer useable medium having computer readable program code embodied therein for reporting on performance of a plurality of parameters, the program product comprising:
    program code configured to select an analysis duration and at least one analysis point within the analysis duration;
    program code configured to determine an excess inventory with a manufacturing limitation and an excess inventory without the manufacturing limitation for each analysis point (AP);
    program code configured to determine a trapped inventory (OT) based on a difference between the excess inventory with the manufacturing limitation and the excess inventory without the manufacturing limitation;
    program code configured to determine a policy inventory (P);
    program code configured to determine a policy and trapped inventory (PT) based on a difference between the excess inventory with the manufacturing limitation and the policy inventory and the excess inventory without the manufacturing limitation;

program code configured to determine an optimum inventory (O) for each analysis point based on the policy and trapped inventory (PT) and the trapped inventory (OT) for each analysis point using the at least one computer according to the following algorithms $$AP\text{-}P = \max(0, AP_{OT} - AP_{PT})$$

and:

$$AP\text{-}O = AP_{OT} - AP\text{-}P$$

wherein $AP_{OT}$, is the consumption calculated with the trapped only (OT) data; $AP_{PT}$ is the consumption calculated with the policy and trapped (PT) data; AP-O are part of the $AP_{OT}$ that is not affected by the policy inventory; and program code configured to determine an impact of the policy inventory on an inventory consumption.

13. The computer program product of claim 12, further comprising program code configured to determine a total optimum inventory based on the optimum inventory at each analysis point.

14. The computer program product of claim 12, further comprising program code configured to determine an inventory that will be consumed in a short term, an inventory that will be consumed in a mid term, an inventory that will be consumed in a long term and an inventory that will not be consumed in a period of time, wherein the short term, mid term and long term are within the analysis duration.

15. The computer program code of claim 12, further comprising program code configured to decide an inventory size based on the excess inventory, the trapped inventory and the impact of the policy inventory.

* * * * *